United States Patent
Nakao

Patent Number: 6,028,676
Date of Patent: *Feb. 22, 2000

[54] OUTPUT METHOD AND APPARATUS FOR ESTIMATING IMAGE QUALITY PRIOR TO OUTPUT

[75] Inventor: Makiko Nakao, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/908,182

[22] Filed: Aug. 7, 1997

Related U.S. Application Data

[63] Continuation of application No. 08/322,161, Oct. 13, 1994, abandoned.

[30] Foreign Application Priority Data

Oct. 27, 1993 [JP] Japan ................................ 5-269087

[51] Int. Cl.⁷ ........................................ G06K 9/40
[52] U.S. Cl. ........................................ 358/1.16
[58] Field of Search ...................... 395/115, 114, 395/113, 112, 117, 101, 110, 111, 109, 116, 326, 339; 358/116

[56] References Cited

U.S. PATENT DOCUMENTS

| | | | |
|---|---|---|---|
| 4,975,785 | 12/1990 | Kantor | 353/447 |
| 5,068,805 | 11/1991 | Tsuzuki | 395/164 |
| 5,129,049 | 7/1992 | Cuzzo et al. | 395/113 |
| 5,150,454 | 9/1992 | Wood et al. | 395/115 |
| 5,208,676 | 5/1993 | Inui | 358/296 |
| 5,216,754 | 6/1993 | Sathi et al. | |
| 5,249,053 | 9/1993 | Jain | 358/209 |
| 5,268,993 | 12/1993 | Ikenoue et al. | 395/114 |
| 5,270,728 | 12/1993 | Lund | 396/1.1 |
| 5,294,976 | 3/1994 | Ohyama et al. | 358/229 |
| 5,333,212 | 7/1994 | Ligtenberg | 382/56 |
| 5,339,172 | 8/1994 | Robinson | 358/462 |
| 5,345,517 | 9/1994 | Katayama et al. | 382/54 |
| 5,351,314 | 9/1994 | Vaezi | 382/54 |
| 5,374,916 | 12/1994 | Chu | 340/146 |
| 5,386,301 | 1/1995 | Yuasa et al. | 358/445 |
| 5,408,336 | 4/1995 | Ishida | 358/447 |
| 5,420,614 | 5/1995 | Fukui et al. | 396/130 |
| 5,488,483 | 1/1996 | Murayama | 358/426 |

FOREIGN PATENT DOCUMENTS 9211596  7/1992  WIPO .................. G06F 3/12

*Primary Examiner*—Steven P. Sax
*Attorney, Agent, or Firm*—Fitzpatrick, Cella, Harper & Scinto

[57] ABSTRACT

An output apparatus and method is capable of transferring information showing a print data amount, determining a memory amount and estimating whether an inferior image will be output or not in accordance with the print data amount and memory amount. Accordingly, the apparatus and method can determine in advance whether to transfer the data, whether to print the data and whether to provide a display to an operator indicating that an output image will be of inferior quality.

65 Claims, 7 Drawing Sheets

OUTPUT METHOD AND APPARATUS FOR ESTIMATING IMAGE QUALITY PRIOR TO OUTPUT

This application is a continuation of application Ser. No. 08/322,161 filed Oct. 13, 1994, now abandoned.

BACKGROUND OF THE INVENTION

1. Field of the Invention

This invention relates to an output apparatus such as a printer and a method for transferring data that estimates whether image data will produce an inferior quality image or not prior to output.

2. Related Background Art

When image data is transferred from a host computer to a printer, the image data may be complicated and the printer may have insufficient memory to store all the image data. As a result, an image printed in response to the stored image data will be of inferior quality. Nevertheless, recently some printing devices have been developed which will automatically output the image data even if it results in an inferior image.

If the operator at the printer is unaware of the problem, the resultant image may be inexplicable. The operator may try to output the image data again, resulting in wasted time, or may erroneously conclude that the printer is malfunctioning.

SUMMARY OF THE INVENTION

The present invention has been made in consideration of the above situation, and has as one of its objects to provide an output apparatus and method capable of estimating image quality before printing.

Another object of the present invention is to provide an output apparatus and method capable of estimating image quality before print data is transferred to a printer.

Still another object of the present invention is to provide an output apparatus and method capable of estimating image quality and controlling further data processing in accordance with the estimation.

DETAILED DESCRIPTION OF THE PREFERRED EMBODIMENTS

Embodiments of the present invention will now be described with reference to the accompanying drawings.

Figure 1:
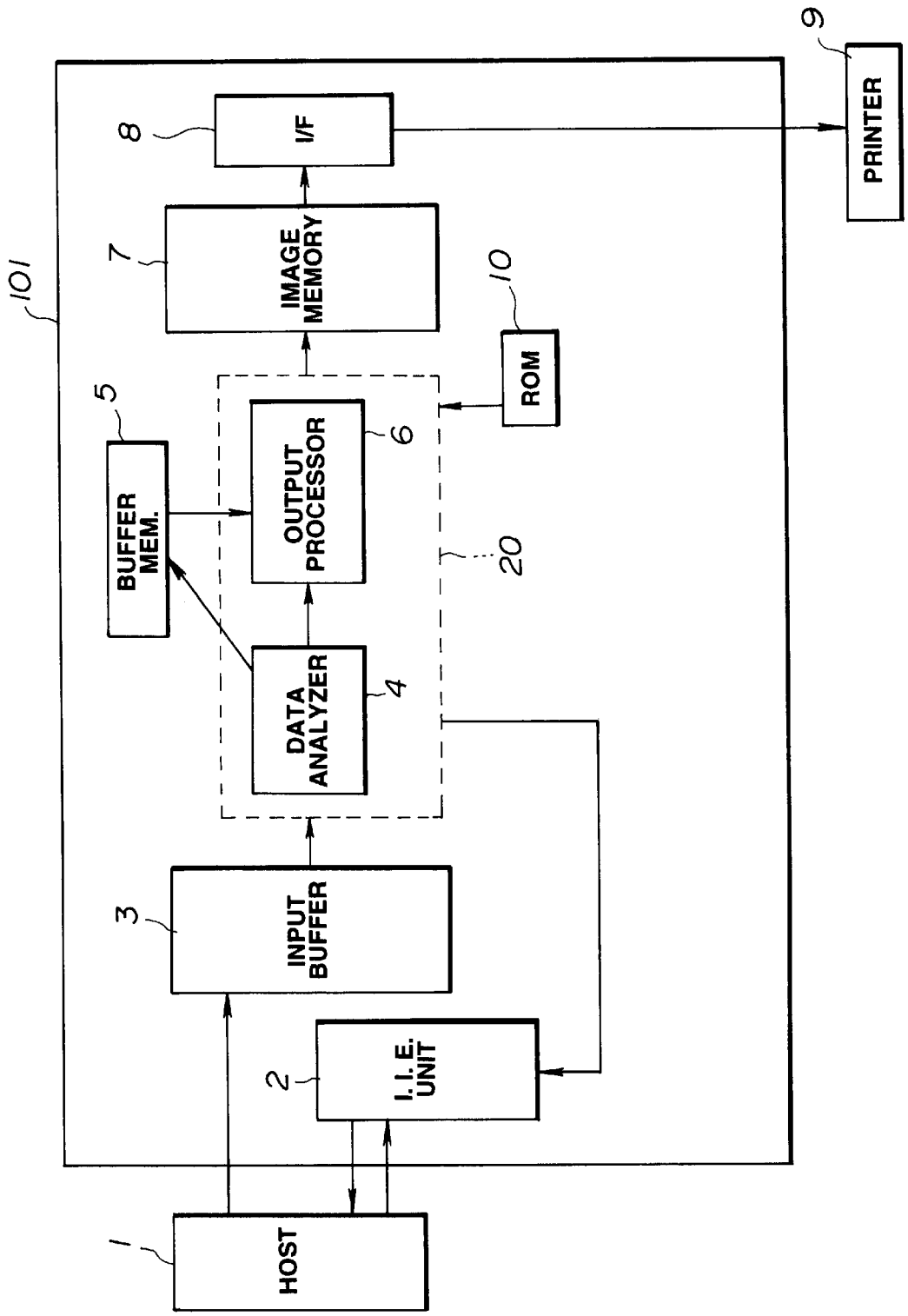
FIG. 1 is a block diagram of a printing apparatus in accordance with a first embodiment of the present invention.

FIG. 1 is a block diagram of a printing apparatus, in this example a laser beam printer operative in accordance with a first embodiment of the present invention.

Numeral 1 denotes a host computer which produces print data including, for example, at least character codes and control codes for editing or control of outputting the character codes, and transfers the print data to a printer control unit 101.

In printer side 30, numeral 2 denotes an image inferiority estimating unit for determining whether data from the host computer 1 can be outputted without producing an inferior image.

Numeral 3 denotes an input buffer for temporarily storing print data from the host computer 1.

Numeral 4 denotes a data analyzing function unit for analyzing data stored in the input buffer 3.

Numeral 5 denotes a buffer memory for storing print data which are analyzed by the data analyzing unit 4.

Numeral 6 denotes an output process function unit for converting the data in the buffer memory 5 to dot patterns and for storing the patterns in an image memory 7. A control unit 20 is defined as including the data analyzing unit 4 and the output process unit 6.

In this embodiment, the capacity of the image memory 7 is less than one page image of data, but is at least two lines, or two groups of lines, of image data. The two lines (or two groups of lines) are arranged such that when transferring image data of one line through interface 8 to a print engine 9, image data can be stored in the other line. The effective size of the image memory 7 depends on the total amount of memory in the apparatus. Therefore, for example, if a memory card is attached to the apparatus, the effective size of the image memory 7 can be increased up to one page.

Numeral 10 denotes a ROM for storing control programs, such as a program described in connection with FIGS. 2–4, and, for example, font data.

Figure 5:
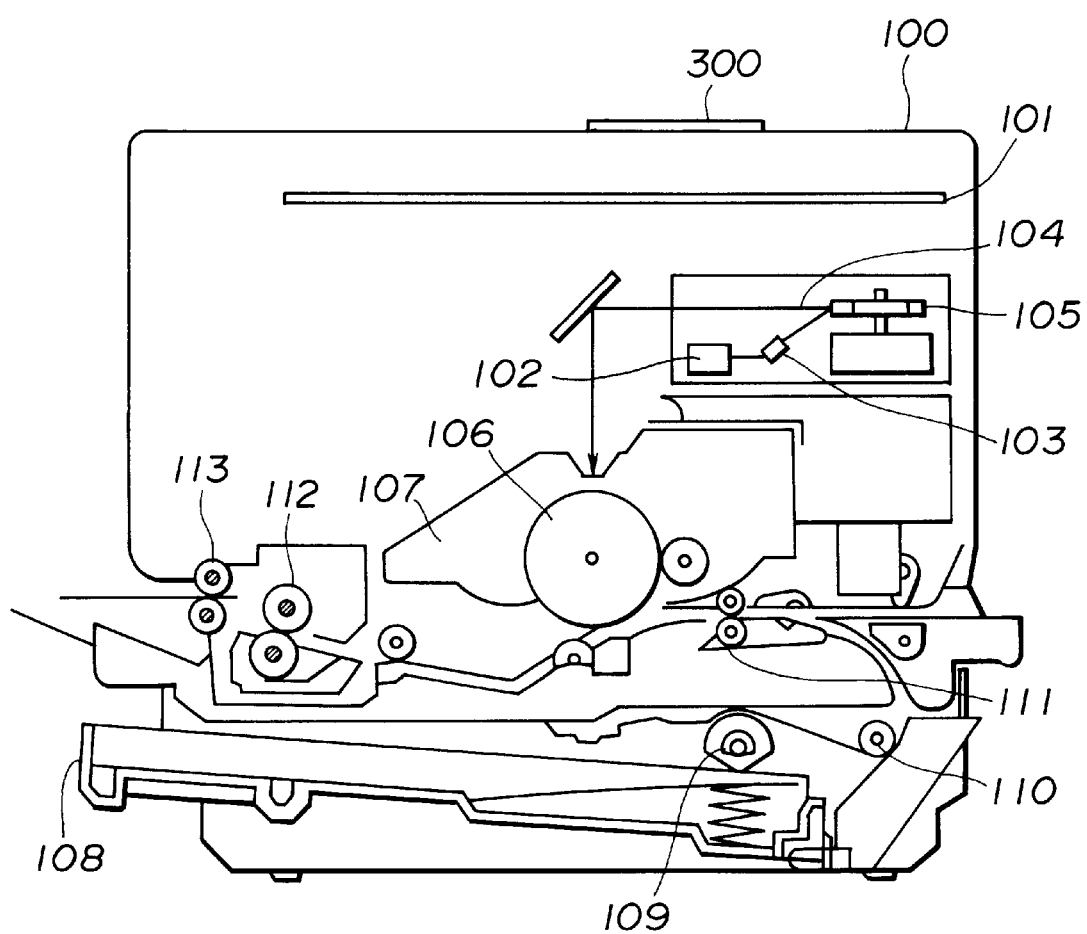
FIG. 5 is a perspective view of a laser beam printer.

FIG. 5 is a cross-sectional view of a recording apparatus, such a laser beam printer, to which the output method of the present invention is applicable.

A main body 100 (printer) of the apparatus receives and stores print data (character information etc.) from information and macro instructions supplied from the external host computer 1, generates and forms character patterns and forms an image on a recording sheet constituting the recording medium. An operation panel 300 includes switches and LED indicators for various operations and a printer control unit 101 includes control elements other than those in the host computer 1 and the print engine 9 described in connection with FIG. 1 for controlling the entire printer 100 and analyzing the character information supplied from the host computer 1. The printer control unit 101 converts the character information into a video signal for the corresponding character patterns and supplies the video signal to a laser driver 102, which in turn drives a semiconductor laser 103 by switching a laser beam 104 emitted from the semiconductor laser 103 on and off according to the input video signal. The laser beam 104 is laterally deflected by a rotary polygon mirror 105 to scan an electrostatic drum 106, thereby forming an electrostatic latent image of the character patterns thereon. The latent image is developed into a visible image by a developing unit 107 positioned around the electrostatic drum 106 and transferred onto the recording sheet. The recording sheet is a cut sheet contained in a cassette 108 mounted on the main body 100 and supplied therefrom by a feed roller 109 and transport rollers 110 and 111 to the electrostatic drum 106.

A change in density is achieved by controlling the rotation speed of the rotary polygon mirror 105, the rotation speed of the electrostatic drum 106 and the rate of transferring data to the laser driver 102 (the number synchronizing signal clocks for serially transferring bit data from the image memory 7).

The operation of the printer control unit 101 will now be described in connection with the structure illustrated in FIG. 1.

If an application program produces a print request in the host computer 1, the host computer 1 produces a print spool file containing the requested print data. When the file is complete, the host computer 1 reads data from the file and transfers it to the printer control unit 101 as print data.

In this embodiment the host computer 1 determines each kind of data to be included while producing the file. The host computer 1 then transfers the result of the determination and information on the size of the file to the printer control unit 101, where the result and information are input to the image inferiority estimating unit 2. The image inferiority estimating unit 2 determines whether and to what degree the apparatus should reduce the density of the image data when printing an output image.

The reason for reducing the density is to enable a page printer engine to execute a print process for each line. For example, while the print process for one line is being executed, the subsequent image data for the next line are produced and stored. However, if there is a very large amount of subsequent image data, it cannot be converted into dot data in time before the next print process. Therefore, by reducing the density, the amount of converted data and the necessary memory area can be reduced, and the apparatus can execute the conversion process in time. If the apparatus has enough memory, the line or group of lines can be large while still leaving enough time to convert the image data. In that case, there is rarely a need to reduce density.

In practice, it is difficult to determine whether the data are complicated or not for each line unit. Therefore, in this embodiment, the apparatus determines whether the data are complicated or not for every page unit.

The image inferiority estimating unit 2 compares the current memory amount in the apparatus and the data which are transferred from the host computer 1 and returns the result to the host computer 1.

If the transferred result indicates a high possibility of image inferiority, that is, that there is insufficient memory to hold all the image data, the host computer 1 produces a display to this effect on the screen of the host computer 1.

After that, if an operator still wishes to continue executing the printing process, he can actuate a manual switch to cause the apparatus to execute the printing process, whose result may be an inferior image.

If the transferred result shows a low possibility of image inferiority, the host computer 1 continues transferring data to the apparatus without interruption or display.

Figure 2:
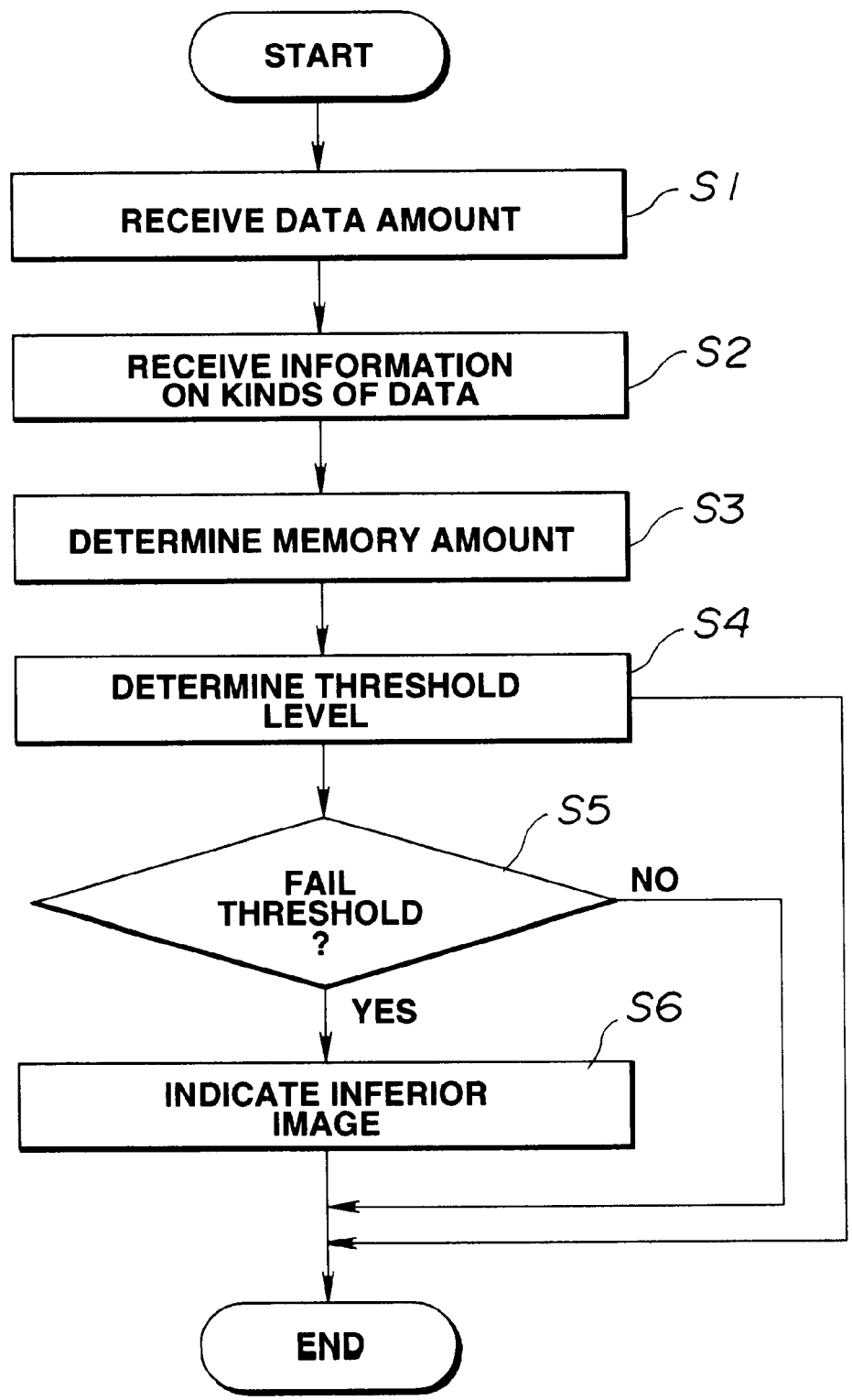
FIG. 2 is a flowchart showing processing steps of a method operative in the first embodiment.

FIG. 2 is a flowchart that shows processing steps in the first embodiment.

In step S1, the control unit 20 of the printer side 30 receives the information which shows the amount of print data to be transferred before it is transferred from the host computer 1. In step S2, the control unit 20 receives information on the kinds of data to be transferred, for example, image data, text data etc. In step S3, the control unit 20 determines a current memory amount of the apparatus and in step S4 the control unit 20 calculates or retrieves an appropriate threshold level which will ensure sufficient image quality at each kind of data in accordance with the memory amount. In step S5, the control unit determines if the data fails to exceed the threshold level or not.

If NO in step S5, the flow advances to an end step and the apparatus prepares for receiving the print data.

If YES in step S5, the flow advances to step S6. In step S6, the apparatus transfers information indicating that a printout of the image will be inferior to the host computer 1.

(The Second Embodiment)

Figure 3:
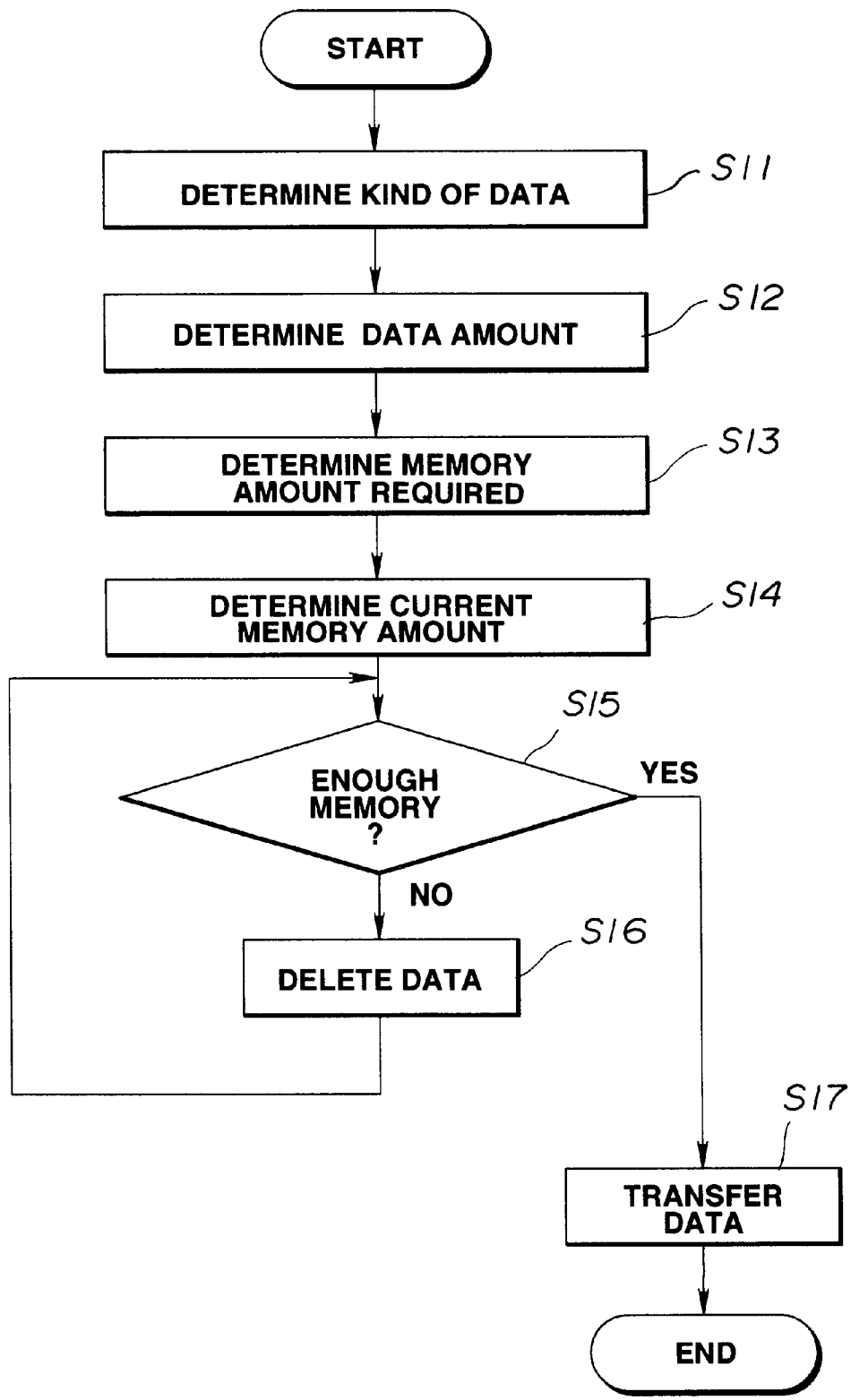
FIG. 3 is a flowchart showing processing steps of a method operative in a second embodiment.

FIG. 3 is a flowchart that shows processing steps in a second embodiment.

One difference from the first embodiment is that the host computer 1 determines whether image inferiority will result or not instead of the apparatus.

In step S11 in FIG. 3, the host computer 1 determines what kinds of data to transfer, for example, such as image data, text data, figure data, before transferring print data.

The flow advances to step S12, in which the host computer 1 determines an amount of print data. In step S13, the host computer 1 calculates the amount memory area necessary to normally execute the output (printing) process. In step S14, the host computer 1 determines an current memory amount of the printer from the printer. In step S15, the host computer 1 determines whether there is enough memory area for the print data or not. If YES in step S15, the process goes to step S17 in which the host computer 1 normally transfers data to the printer. If NO in step S15, the process goes to step S16 in which the host computer 1 controls the printer to delete data, for example, a temporary file or temporarily stored data, from the memory in the printer. After that, the flow returns to step S15 and step S17. In step 17, the host computer 1 transfers data to the printer.

In this explanation, the host computer 1 may control the printer to transfer information showing the memory amount or the operator may previously set this information in a printer driver of the host computer 1. The control unit 20 has the function of deleting data in accordance with the instruction of the host computer 1.

(The Third Embodiment)

Figure 4:
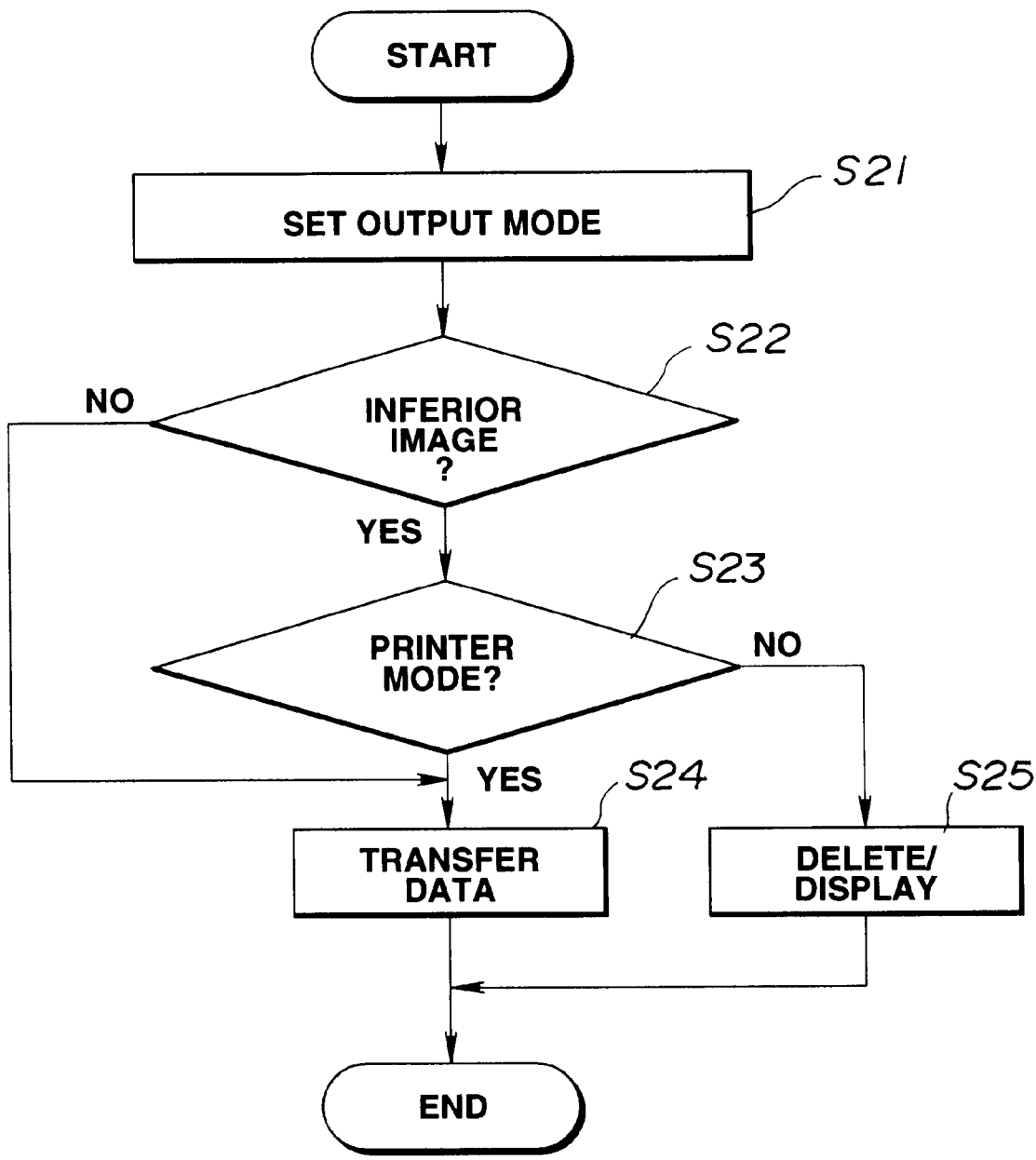
FIG. 4 is a flowchart showing processing steps of a method operative in a third embodiment.

FIG. 4 is a flowchart shows steps in a third embodiment, which is an improvement of the second embodiment.

In step S21, an operator instructs the host computer 1 whether an output process should continue or not if the image will be inferior in accordance with a print indication by an application program. In step S22, the host computer 1 determines whether there will be image inferiority or not. If YES in step S22, the flow advances to step S23. In step S23, the host computer checks the designated mode. If YES in step S23, i.e. if the designated mode is the printing mode to print even an inferior image, the flow advances to step S24. In step S24 the host computer 1 transfers print data to the printer. If NO in step 23, the flow advances to step S25. In step S25, the host computer 1 deletes the printer data, stops transferring print data to the printer, produces a display indicating that image inferiority will occur and stops printing. Therefore, the operator can understand what has happened and why the image was not printed.

As described above, the host computer 1 can estimate the output image quality before printing. Therefore, this invention can alert the operator to avoid printing image data again after outputting inferior image data.

Furthermore, in the first embodiment, the information showing than an inferior image will be printed is transferred to the host computer 1. As an alternative, the necessary memory area can be calculated and displayed, a list of or temporary files can be displayed in turn. The display can alternatively or additionally be executed on a display of the printer, such as a liquid crystal display. Furthermore, a buzzer to inform the operator of inferior image quality can be provided.

In this embodiment, the input buffer memory 3, the buffer memory 5 and the image buffer memory 7 work independently and the print process uses a memory in line units, but this invention is not restricted to these features.

For example, these memories can be designed as separate areas of one memory. If an area for the buffer memory 5 must enlarge so as to infringe on an area for the image buffer memory, the printer cannot output image data with high density. This invention is applicable to this case too. As described above, before transferring print data, this invention can determine whether image inferiority will occur or not.

The apparatus of each embodiment described above utilizes a laser beam printer. However, the present invention is not limited to this and may be equally applied to other printers such as an ink-jet printer.

Figure 6:
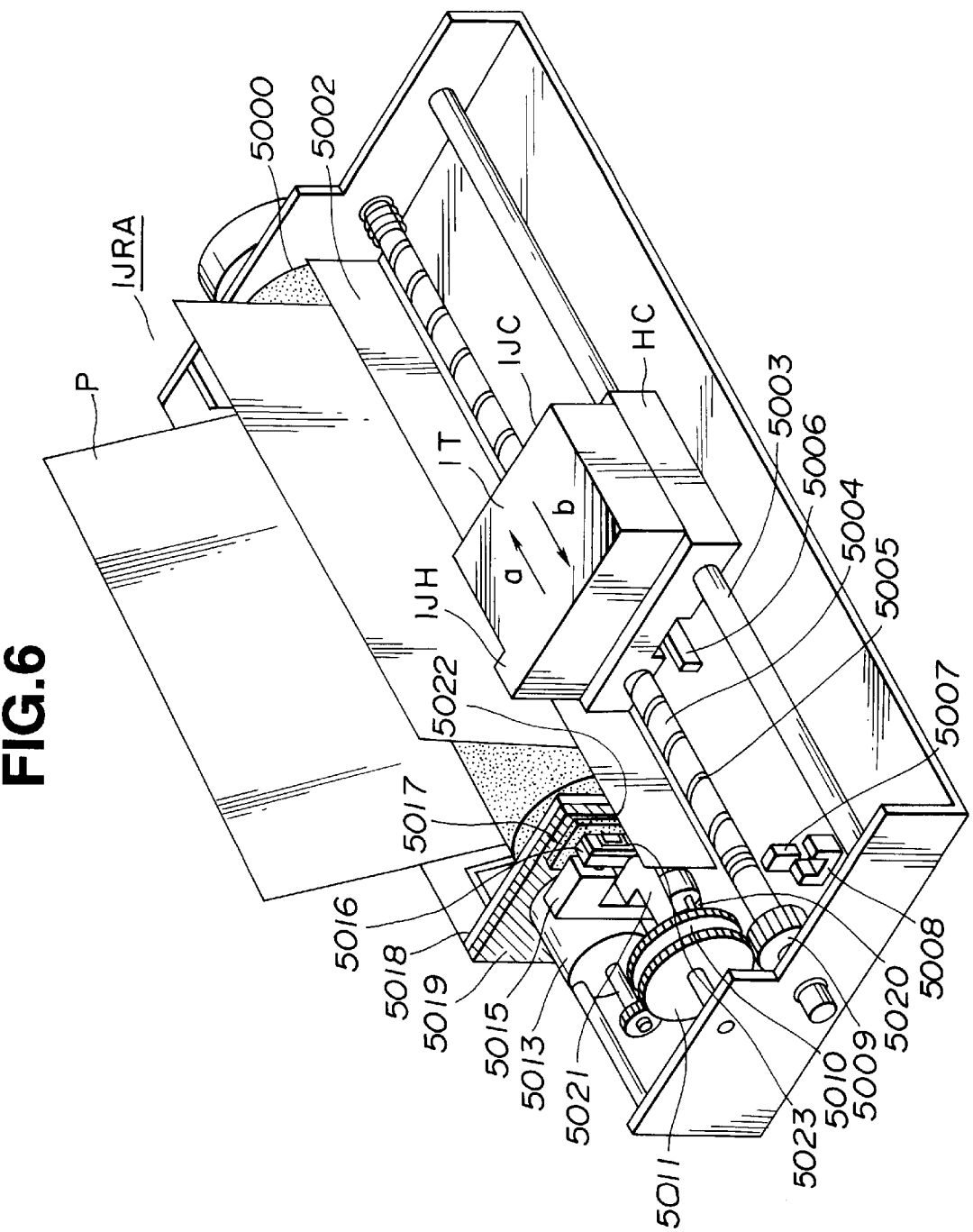
FIG. 6 is a perspective view of the main body of an ink-jet printer.

FIG. 6 is a perspective view of the main body of an ink-jet recording apparatus IJRA to which the present invention can be applied. Referring to FIG. 6, a carriage HC engages with a helical groove 5005 of a lead screw 5004 rotated interlockingly with the normal/reverse rotation of a drive motor 5013 through driving force transmission gears 5011 and 5009 having pin (not shown), and can be reciprocated in directions indicated by arrows a and b. An ink-jet cartridge IJC is mounted on the carriage HC. A paper press plate 5002 presses the paper in the carriage movement direction through a platten 5000. Photosensors 5007 and 5008 are home position detecting means for detecting the presence of a lever 5006 of the carriage within this range to switch the rotational direction of the motor 5013. A member 5016 supports a cap 5002 for capping the front surface of a recording head. A suction device 5015 draws the ink from the cap to recover the recording head through an opening 5023 in the cap. A cleaning blade 5017 is moved back and forth by the member 5019, and the cleaning blade 5017 and the member 5019 are supported on a main body support plate 5018. The blade need not have this form, but can be replaced with a known cleaning blade. A lever 5021 starts suction to recover the recording head. The lever 5021 is moved together with movement of a cam 5020 engaged with the carriage. The driving force from the driving motor is controlled by a known transmitting means such as clutch switching.

Capping, cleaning and suction recovery are performed by desired processes at the corresponding positions in accordance with the behavior of the lead screw 5004 when the carriage reaches the home position. If desired operations are performed at known timings, any scheme therefor can be employed.

Figure 7:
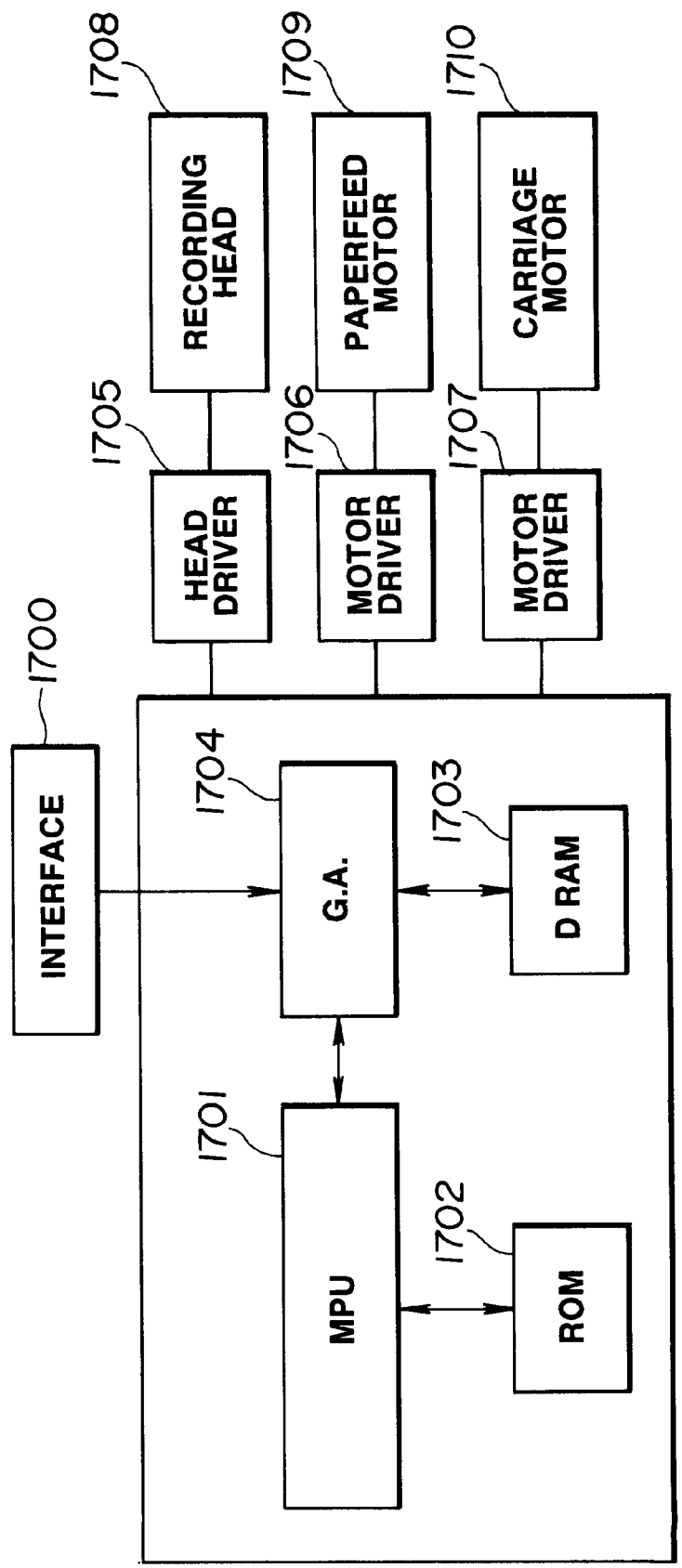
FIG. 7 is a block diagram of a control unit of the ink-jet printer of FIG. 6.

A control arrangement for executing recording control of the respective components in the primary apparatus will now be described with reference to the block diagram in FIG. 7. A control circuit includes an interface 1700 for inputting a recording signal, an MPU (microprocessing unit) 1701, a program ROM 1702 for storing control programs executed by the MPU 1701, a dynamic RAM 1703 for storing various types of data (e.g. the recording signal and recording data supplied to the head), a gate array 1704 for controlling supplying the recording data to a recording head 1708, a paperfeed motor 1709 for conveying a recording sheet, a head driver 1705 for driving the head, the motor drivers 1706 and 1707 for driving the paperfeed motor 1709 and the carriage motor 1710, respectively. The program ROM 1702 includes program as shown above, too.

The operation of the above control arrangement is as follows. When a recording signal is input to the interface 1700, it is converted into print recording data by the gate array 1704 and the MPU 1701. The motor drivers 1706 and 1707 are driven to drive the recording head in accordance with the recording data supplied to the head driver 1705, thereby printing the recording information.

As described above, the invention can provide an output apparatus and method capable of transferring information showing a print data amount, determining a memory amount and estimating whether an inferior image will be output or not in accordance with the print data amount and memory amount. Accordingly, the apparatus and method can determine in advance whether to transfer the data, whether to print the data and whether to provide a display to an operator indicating that an output image will be of inferior quality.

What is claimed is:

1. A printing system having a data source and a printing apparatus for printing an image formed on the basis of print data input from said data source, said system comprising:

discriminating means for discriminating whether or not said printing apparatus can print the image with a first image quality;

print control means for, when said discriminating means discriminates that said printing apparatus cannot print the image with the first quality, controlling said printing apparatus to form the image with a second image quality lower than the first image quality and to print the image with the second image quality; and display control means for, when said discriminating means discriminates that said printing apparatus cannot print the image with the first quality, causing a display unit to display a result of the discrimination to require an operator to instruct said system whether or not to print before said printing apparatus prints the image with the second image quality.

2. A system according to claim 1, wherein the data source is a host computer.

3. A system according to claim 1, wherein the data comprises text data.

4. A system according to claim 1, further comprising means for generating image data on the basis of the data from said data source.

5. A system according to claim 1, wherein the image with the second image quality is a low resolution image.

6. A system according to claim 1, wherein said discriminating means includes means for comparing a memory capacity required for outputting the image with the first image quality with a currently available memory capacity.

7. A system according to claim 1, further comprising instructing means for use by the operator to instruct said system whether or not to print, wherein said printing control means forms the image with the second image quality and controls said printing apparatus to print only after said instructing means instructs the system to print.

8. A method of operating a printing system having a data source and a printing apparatus for printing an image formed on the basis of print data input from the data source, said method comprising:

a discriminating step of discriminating whether or not the printing apparatus can print the image with a first image quality;

a print control step of, when said discriminating step discriminates that the printing apparatus cannot print the image with the first quality, controlling the printing apparatus to form the image with a second image quality lower than the first image quality and to print the image with the second image quality; and a display control step of, when said discriminating step discriminates that the printing apparatus cannot print the image with the first quality, causing a display unit to display a result of the discrimination to require an operator to instruct the system whether or not to print before the printing apparatus prints the image with the second image quality.

9. A method according to claim 8, wherein the data source is a host computer.

10. A method according to claim 8, wherein the data comprises text data.

11. A method according to claim 8, further comprising a step of generating image data on the basis of the data from the data source.

12. A method according to claim 8, wherein the image with the second image quality is a low resolution image.

13. A method according to claim 8, wherein said discriminating step includes a step of comparing a memory capacity required for outputting the image with the first image quality with a currently available memory capacity.

14. A method according to claim 8, further comprising an instructing step by the operator using instructing means to instruct the system whether or not to print, wherein said printing control step forms the image with the second image quality and controls the printing apparatus to print only after said instructing step instructs the system to print.

15. A computer usable medium having computer readable program means embodied therein for operating a printing system having a data source and a printing apparatus for printing an image formed on the basis of print data input from the data source, comprising:

first program means for performing a discriminating step of discriminating whether or not the printing apparatus can print the image with a first image quality;

second program means for performing a print control step of, when said discriminating step discriminates that the printing apparatus cannot print the image with the first quality, controlling the printing apparatus to form the image with a second image quality lower than the first image quality and to print the image with the second image quality; and third program means for performing a display control step of, when said discriminating step discriminates that the printing apparatus cannot print the image with the first quality, causing a display unit to display a result of the discrimination to require an operator to instruct the system whether or not to print before the printing apparatus prints the image with the second image quality.

16. A computer usable medium having computer readable program means embodied therein according to claim 15, wherein the data source is a host computer.

17. A computer usable medium having computer readable program means embodied therein according to claim 15, wherein the input data comprises text data.

18. A computer usable medium having computer readable program means embodied therein according to claim 15, further comprising third program means for performing a step of generating image data on the basis of the data from the data source.

19. A computer usable medium having computer readable program means embodied therein according to claim 15, wherein the image with the second image quality is a low resolution image.

20. A computer usable medium having computer readable program means embodied therein according to claim 15, wherein said discriminating step includes a step of comparing a memory capacity required for outputting the image with the first image quality with a currently available memory capacity.

21. A computer useable medium having computer readable program means embodied therein according to claim 15, further comprising fourth program means for performing an instructing step by the operator using instructing means to instruct the system whether or not to print, wherein said printing control step forms the image with the second image quality and controls the printing apparatus to print only after said instructing step instructs the system to print.

22. A printing apparatus for printing an image formed on the basis of print data input from a data source, said apparatus comprising:

discriminating means for discriminating whether or not said printing apparatus can print the image with a first image quality;

print control means for, when said discriminating means discriminates that said printing apparatus cannot print the image with the first quality, controlling said printing apparatus to form the image with a second image quality lower than the first image quality and to print the image with the second image quality; and transmitting means for, when said discriminating means discriminates that said printing apparatus cannot print the image with the first quality, transmitting a result of the discrimination to the data source to require an operator to instruct said printing apparatus whether or not to print before said printing apparatus prints the image with the second image quality.

23. An apparatus according to claim 22, wherein the data source is a host computer.

24. An apparatus according to claim 22, wherein the data comprises text data.

25. An apparatus according to claim 22, further comprising means for generating image data on the basis of the data from the data source.

26. An apparatus according to claim 22, wherein the image with the second image quality is a low resolution image.

27. An apparatus according to claim 22, wherein said discriminating means includes means for comparing a memory capacity required for outputting the image with the first image quality with a currently available memory capacity.

28. An apparatus according to claim 22, further comprising instructing means for use by the operator to instruct said apparatus whether or not to print, wherein said printing control means forms the image with the second image quality and controls said printing apparatus to print only after said instructing means instructs the system to print.

29. A printing method of printing, using a printing apparatus, an image formed on the basis of print data input from a data source, said method comprising the steps of:

discriminating whether or not the printing apparatus can print the image with a first image quality;

when said discriminating step discriminates that the printing apparatus cannot print the image with the first quality, controlling the printing apparatus to form the image with a second image quality lower than the first image quality and to print the image with the second image quality; and when said discriminating step discriminates that the printing apparatus cannot print the image with the first quality, transmitting a result of the discrimination to the data source to require an operator to instruct the printing apparatus whether or not to print before the printing apparatus prints the image with the second image quality.

30. A method according to claim 28, wherein the data source is a host computer.

31. A method according to claim 29, wherein the data comprises text data.

32. A method according to claim 29, further comprising a step of generating image data on the basis of the data from the data source.

33. A method according to claim 29, wherein the image with the second image quality is a low resolution image.

34. A method according to claim 29, wherein said discriminating step includes a step of comparing a memory capacity required for outputting the image with the first image quality with a currently available memory capacity.

35. A method according to claim 29, further comprising an instructing step by the operator using instructing means to instruct the printing apparatus whether or not to print, wherein said printing control step forms the image with the second image quality and controls the printing apparatus to print only after said instructing step instructs the printing apparatus to print.

36. A print control apparatus for forming an image formed on the basis of print data input from a data source and controlling a printer to printer to print the image, and apparatus comprising:

discriminating means for discriminating whether or not a printing process of the image can be completed with a first image quality;

print control means for, when said discriminating means discriminates that the printing process cannot be completed with the first image quality, controlling said apparatus to form the image with a second image quality lower than the first image quality and controlling the printer to print the image with the second image quality; and information means for, when said discriminating means discriminates that the printing process cannot be completed with the first image quality, informing an operator of a result of the discrimination to prompt the operator to enter an instruction to said apparatus, before the printer prints the image with the second image quality, instructing whether or not the printing process is to continue.

37. An apparatus according to claim 36, wherein each of the first and second image qualities indicates a respective resolution.

38. An apparatus according to claim 36, wherein said information means displays the result on a display unit disposed in the printer.

39. An apparatus according to claim 36, wherein said discriminating means comprises comparing means for comparing a memory capacity needed for outputting the image with the first image quality with a currently usable memory capacity.

40. An apparatus according to claim 36, wherein, when said discriminating means discriminates that the printing process can be completed with the first image quality, said print control means controls said apparatus to form the image with the first image quality and said information means does not inform the operator of the result of discrimination.

41. An apparatus according to claim 36, wherein, when the instruction to continue the printing process is input, said print control means controls the printer to print the image with the second image quality.

42. A print control method in a print control apparatus for forming an image formed on the basis of print data input from a data source and controlling a printer to printer to print the image, said method comprising the steps of:

discriminating whether or not a printing process of the image can be completed with a first image quality;

when said discriminating step discriminates that the printing process cannot be completed with the first image quality, controlling the apparatus to form the image with a second image quality lower than the first image quality and controlling the printer to print the image with the second image quality; and when said discriminating step discriminates that the printing process cannot be completed with the first image quality, informing an operator of a result of the discrimination to prompt the operator to enter an instruction to the apparatus, before the printer prints the image with the second image quality, instructing whether or not the printing process is to continue.

43. A method according claim 42, wherein each of the first and second image qualities indicates a respective resolution.

44. A method according to claim 42, wherein said informing step displays the result on a display unit disposed in the printer.

45. A method according the claim 42, wherein said discriminating step comprises a comparing step of comparing a memory capacity needed for outputting the image with the first image quality with a currently usable memory capacity.

46. A method according the claim 42, wherein, when said discriminating step discriminates that the printing process can be completed with the first image quality, said control step controls the apparatus to form the image with the first image quality and said informing step does not inform the operator of the result of discrimination.

47. A method according to claim 42, wherein, when the instruction to continue the printing process is input, said control step controls the printer to print the image with the second image quality.

48. A computer readable storage medium that stores program codes for executing a print control method in a print control apparatus for forming an image formed on the basis of print data input from a data source and controlling a printer to printer to print the image, said method comprising the steps of:

discriminating whether or not a printing process of the image can be completed with a first image quality;

when said discriminating step discriminates that the printing process cannot be completed with the first image quality, controlling the apparatus to form the image with a second image quality lower than the first image quality and controlling the printer to print the image with the second image quality; and when said discriminating step discriminates that the printing process cannot be completed with the first image quality, informing an operator of a result of the discrimination to prompt the operator to enter an instruction to the apparatus, before the printer prints the image with the second image quality, instructing whether or not the printing process is to continue.

49. A mediium according to claim 48, wherein each of the first and second image qualities indicates a respective resolution.

50. A medium according the claim 48, wherein said informing step displays the result on a display unit disposed in the printer.

51. A medium according the claim 48, wherein said discriminating step comprises a comparing step of comparing a memory capacity needed for outputting the image with the first image quality with a currently usable memory capacity.

52. A medium according to claim 48, wherein, when said discriminating step discriminates that the printing process can be completed with the first image quality, said control step controls the apparatus to form the image with the first image quality and said informing step does not inform the operator of the result of discrimination.

53. A medium according the claim 48, wherein, when the instruction to continue the printing process is input, said control step controls the printer to print the image with the second image quality.

54. An information processing apparatus for forming print data to be printed by a printing apparatus, said apparatus comprising:

discriminating means for discriminating whether or not a printing process can be completed with a first image quality on the basis of printing information input from an application and a memory capacity of the printing apparatus;

receiving means for, when said discriminating means discriminates that the printing process cannot be completed with the first image quality, selectively receiving a designation of output mode indicating that the printing process is to be continued to complete the image with a second image quality lower than the first image quality; and control means for continuing the printing process when said discriminating means discriminates that the printing process cannot be completed with the first image quality and said receiving means receives the designation, said control means displaying an instruction for stopping the printing process when said discriminating means discriminates that the printing process cannot be completed with the first image quality and said receiving means does not receive the designation.

55. An apparatus according to claim 54, wherein, when said discriminating means discriminates that the printing process cannot be completed with the first image quality and said receiving means does not receive the designation, said control means stops outputting print data to the printing apparatus and deletes the print data for printing by the printing apparatus.

56. An apparatus according to claim 54, wherein said discriminating means discriminates whether or not the printing process can be completed with the first image quality on the basis of a usable memory capacity of a memory in the printing apparatus from which unnecessary data is deleted.

57. An apparatus according to claim 54, wherein said discriminating means obtains the memory capacity of the printing apparatus set as a printer driver.

58. A method in an information processing apparatus for forming print data to be printed by a printing apparatus, said method comprising the steps of:

discriminating whether or not a printing process can be completed with a first image quality on the basis of printing information input from an application and a memory capacity of the printing apparatus;

when said discriminating step discriminates that the printing process cannot be completed with the first image quality, selectively receiving a designation of output mode indicating that the printing process is to be continued to complete the image with a second image quality lower than the first image quality; and controlling to continue the printing process when said discriminating step discriminates that the printing process cannot be completed with the first image quality and said receiving step receives the designation, said controlling step displaying an instruction for stopping the printing process when said discriminating step discriminates that the printing process cannot be completed with the first image quality and said receiving step does not receive the designation.

59. A method according to claim 58, wherein, when said discriminating step discriminates that the printing process cannot be completed with the first image quality and said receiving step does not receive the designation, said controlling step stops outputting print data to the printing apparatus and deletes the print data for printing by the printing apparatus.

60. A method according to claim 58, wherein said discriminating step discriminates whether or not the printing process can be completed with the first image quality on the basis of a usable memory capacity of a memory in the printing apparatus from which unnecessary data is deleted.

61. A method according to claim 58, wherein said discriminating step obtains the memory capacity of the printing apparatus set as a printer driver.

62. A computer readable medium that stores program codes for executing a method in an information processing apparatus for forming print data to be printed by a printing apparatus, said method comprising the steps of:

discriminating whether or not a printing process can be completed with a first image quality on the basis of printing information input from an application and a memory capacity of the printing apparatus;

when said discriminating step discriminates that the printing process cannot be completed with the first image quality, selectively receiving a designation of output mode indicating that the printing process is to be continued to complete the image with a second image quality lower than the first image quality; and controlling to continue the printing process when said discriminating step discriminates that the printing process cannot be completed with the first image quality and said receiving step receives the designation, said controlling step displaying an instruction for stopping the printing process when said discriminating step discriminates that the printing process cannot be completed with the first image quality and said receiving step does not receive the designation.

63. A medium according to claim 62, wherein, when said discriminating step discriminates that the printing process cannot be completed with the first image quality and said receiving step does not receive the designation, said controlling step stops outputting print data to the printing apparatus and deletes the print data for printing by the printing apparatus.

64. A medium according to claim 62, wherein said discriminating step discriminates whether or not the printing process can be completed with the first image quality on the basis of a usable memory capacity of a memory in the printing apparatus from which unnecessary data is deleted.

65. A medium according to claim 62, wherein said discriminating step obtains the memory capacity of the printing apparatus set as a printer driver.

* * * * *

UNITED STATES PATENT AND TRADEMARK OFFICE
CERTIFICATE OF CORRECTION

PATENT NO. : 6,028,676
DATED : February 22, 2000
INVENTOR(S) : MAKIKO NAKAO

It is certified that error appears in the above-identified patent and that said Letters Patent is hereby corrected as shown below:

COLUMN 4

Line 15, "amount" should read --amount of--.
Line 17, "an" should read --a--.

COLUMN 9

Line 22, "to printer" should be deleted; and "and" should read --said--.
Line 66, "to printer" should be deleted.

COLUMN 10

Line 40, "to printer" should be deleted.
Line 57, "mediium" should read --medium--.

Signed and Sealed this

Twentieth Day of February, 2001

Attest:

NICHOLAS P. GODICI

*Attesting Officer*     *Acting Director of the United States Patent and Trademark Office*